US007953104B2

(12) United States Patent
Brockmann et al.

(10) Patent No.: US 7,953,104 B2
(45) Date of Patent: *May 31, 2011

(54) TRANSMISSION PROTECTION FOR COMMUNICATIONS NETWORKS HAVING STATIONS OPERATING WITH DIFFERENT MODULATION FORMATS

(75) Inventors: Ronald A. Brockmann, Utrecht (NL); Maarten Hoeben, Amersfoort (NL); Maarten Menzo Wentink, Utrecht (NL)

(73) Assignee: Xocyst Transfer AG L.L.C., Wilmington, DE (US)

( * ) Notice: Subject to any disclaimer, the term of this patent is extended or adjusted under 35 U.S.C. 154(b) by 1030 days.

This patent is subject to a terminal disclaimer.

(21) Appl. No.: 11/280,573

(22) Filed: Nov. 16, 2005

(65) Prior Publication Data
US 2006/0092885 A1    May 4, 2006

Related U.S. Application Data

(63) Continuation of application No. 10/295,596, filed on Nov. 15, 2002, now Pat. No. 6,977,944.

(60) Provisional application No. 60/347,412, filed on Jan. 12, 2002.

(51) Int. Cl.
*H04L 12/413* (2006.01)
(52) U.S. Cl. ........................ 370/445; 370/447
(58) Field of Classification Search ................. 370/329, 370/341, 344, 345, 346, 349, 431, 442, 443, 370/445, 447, 449, 450, 459, 462, 456, 458, 370/461
See application file for complete search history.

(56) References Cited

U.S. PATENT DOCUMENTS

| 4,719,620 | A | 1/1988 | Machino et al. ................. 370/85 |
| 5,231,634 | A | 7/1993 | Giles et al. .................... 370/95.1 |
| 5,502,724 | A | 3/1996 | Chen et al. .................... 370/85.3 |
| 5,706,428 | A | 1/1998 | Boer et al. ....................... 395/200 |
| 5,844,905 | A | 12/1998 | McKay et al. ................. 370/443 |
| 5,940,399 | A | 8/1999 | Weizman ....................... 370/445 |
| 6,078,588 | A | 6/2000 | Dove et al. .................... 370/412 |
| 6,195,334 | B1 | 2/2001 | Kadambi et al. .............. 370/236 |

(Continued)

FOREIGN PATENT DOCUMENTS
EP    1178630 A1    2/2002

OTHER PUBLICATIONS

Joa-Ng M., et al.; "Spread Spectrum Medium Access Protocol with Collision Avoidance in Mobile Ad-Hoc Wireless Network," Infocom 1999, Mar. 1999, pp. 776-783, IEEE, Piscataway, NJ.

(Continued)

*Primary Examiner* — Brenda Pham

(57) ABSTRACT

A technique to allow enhanced stations and legacy stations to work with each other without the inefficiencies of signaling overhead in the prior art is disclosed. An enhanced station transmits an initial, short frame using a modulation compatible with legacy stations. The frame sets the duration for a frame exchange—consisting of a data frame, followed by acknowledgement frame—in which the data frame is transmitted using an enhanced modulation format. The duration specified in the transmitted initial frame covers the time interval of the subsequent frame exchange. All stations, including legacy stations, listen in on the frame exchange and refrain subsequently from transmitting spontaneously for the time interval covered by the duration. Alternatively, the frame exchange can comprise multiple data frames with corresponding acknowledgement frames. The enhanced station can also transmit, during the remaining frame exchange, one or more intermediate frames that indicate duration.

37 Claims, 11 Drawing Sheets

U.S. PATENT DOCUMENTS

| | | | |
|---|---|---|---|
| 6,240,083 B1 | 5/2001 | Wright et al. | 370/348 |
| 6,404,756 B1 | 6/2002 | Whitehill et al. | 370/338 |
| 6,469,997 B1 | 10/2002 | Dorenbosch et al. | 370/337 |
| 6,977,944 B2* | 12/2005 | Brockmann et al. | 370/461 |
| 7,054,329 B2* | 5/2006 | Cervello et al. | 370/447 |

OTHER PUBLICATIONS

Halford, S., et al.; "CCK-OFDM Normative Text Summary," IEEE Standard Submission, Online—Jul. 2001 pp. 1-42 <URL: http://grouper.ieee.org/groups/802/11/Documents/DocumentHolder/1-4.

Halford, S., et al.; "OFDM as a High Rate Extension to the CCK-based 802.11b Standard," IEEE Proposed Standard Submission, Mar. 2001 pp. 1-35, <URL.

IEEE: "Draft Supplement to IEEE Std. 802.11, 1999 Edition," IEEE Standard Draft, Jul. 2001 pp. 1-29, Retrieved from the Internet.

Halford, S., et al.; "Proposed Draft Text:B+A=G High Rate Extension to the 802.11b Standard," IEEE Proposed Standard, Nov. 2001 pp. 1-68.

K. C. Chen, "Medium Access Control of Wireless LANs for Mobile Computing", IEEE Network, vol. 8, No. 5, 1994, pp. 50-63.

International Preliminary Examination Report for PCT/US03/000644, completed Jan. 29, 2004.

International Search Report for PCT/US03/000644, mailed Oct. 14, 2003.

V. Bhargavan, A. Demers, S. Shenlcer, L. Zhang, "MACAW: A Media Access Protocol for Wireless LANs" Proceeding of SIGCOMM 94, London, England, Aug. 1994, pp. 212-225.

Wireless LAN Medium Access Control (MAC) and Physical Layer (PHY) specifications, IEEE 802.11, 1999 Edition, 528 pages.

* cited by examiner

TRANSMISSION PROTECTION FOR COMMUNICATIONS NETWORKS HAVING STATIONS OPERATING WITH DIFFERENT MODULATION FORMATS

CROSS REFERENCE TO RELATED APPLICATIONS

This application is a continuation of U.S. patent application Ser. No. 10/295,596, entitled "Transmission Protection for Communications Networks Having Stations Operating With Different Modulation Formats" filed on Nov. 15, 2002, now U.S. Pat, No. 6,977,944 which claims the benefit of U.S. Provisional Patent Application Ser. No.: 60/347,412, entitled "Transmission Protection For Wireless LAN Stations Operating With Different Modulation Formats," filed on Jan. 12, 2002, both of which are incorporated by reference in their entirety.

FIELD OF THE INVENTION

The present invention relates to communications protocols in general, and, more particularly, to techniques for reducing the likelihood of collisions between data packets in wireless communications channels.

BACKGROUND OF THE INVENTION

The IEEE 802.11 set of protocols includes 802.11(b) and 802.11(a). Also known as 802.11 High Rate or Wi-Fi (i.e., "wireless fidelity"), the 802.11(b) approach was approved by the IEEE in 1999 and is currently the mainstream technology adopted by wireless device manufacturers. Essentially using a Direct-Sequence Spread Spectrum (DSSS) technique, 802.11(b) uses a modulation scheme known as Complementary Code Keying (CCK) to transmit data signals at 11 megabits per second (Mbps) over an unlicensed portion of the radio frequency spectrum at around 2.4 GHz. IEEE 802.11(b) enabled a new generation of products to communicate wirelessly with an Ethernet-like connection. Unfortunately, however, the speed of 802.11(b) is only one-tenth that of its wired counterpart, IEEE 802.3.

The IEEE 802.11(a) standard was approved concurrently with 802.11(b), but utilizes Orthogonal Frequency Division Multiplexing (OFDM) as the modulation technique for signal transmission. OFDM is not compatible with 802.11(b) devices because they use CCK modulation. IEEE 802.11(a) technology can transmit data signals at up to 54 Mbps and operates in the 5 GHz frequency spectrum.

It would be desirable to extend the benefits of higher bit rate OFDM transmission to the 2.4 GHz band, which, between the two modulations, is the exclusive domain of the CCK scheme of 802.11(b). The IEEE 802.11(g) standard attempts to merge these operational characteristics together. IEEE 802.11(g) OFDM transmissions, however, are hidden from the legacy 802.11(b) nodes, because the 802.11(b) "physical carrier sense mechanism," explained shortly, does not detect the OFDM carrier.

In the prior art, 802.11(g) nodes can fall back to the "virtual carrier sense mechanism" to protect OFDM transmissions from colliding (i.e., experiencing collisions) with transmissions using other modulations. The 802.11 medium access control (MAC) is based around a collision avoidance mechanism, meaning that nodes defer to an active transmission because they see that the shared channel (or "medium") is busy. Their clear channel assessment is a mechanism that senses a physical carrier on the medium.

Furthermore, the MAC protocol defines a virtual carrier sense mechanism, in addition to the traditional physical carrier sense mechanism. To implement the virtual carrier sense mechanism, each node maintains a network allocation vector (NAV) counter that indicates whether the medium must be considered busy or not. After each frame reception at a node (whether the frame has been directed to the node or not), the node initializes its NAV counter with a duration value that is obtained from the duration field in the frame header of the received frame. Over time, this duration value decrements down until it reaches zero, indicating that it is presumptively safe to transmit. Conversely, a non-zero NAV value indicates that the virtual carrier sense (and the share channel) is busy.

An acknowledgement (ACK) frame acknowledges receipt of each transmitted data frame. The ACK frame is NAV protected by the preceding data frame, in which the duration field in the data frame specifies a duration value that reserves the medium until the end of the ACK transmission. Alternatively, the first frame transmitted in a signal stream can carry a value in the duration field that covers the entire remaining frames exchanged, possibly comprising multiple data frames and ACK frames. In other words, the duration value covers the subsequent frame exchange, in which each frame exchange is typically one or more pairs of a data frame responded to with an ACK frame.

The virtual-carrier sense mechanism, a familiar part of the 802.11 standard, has been previously used to solve a different problem unique to wireless networks. First and second nodes can potentially be separated by a distance greater than their respectively transmitted signals (carriers) can reach, while an intermediate third node can be close enough to each of the first and second nodes to hear both signals.

FIG. 1 depicts telecommunications system 100 of the prior art, comprising nodes 102-1, 102-2, and 102-3. Rings 103-1, 103-2, and 103-3 represent the respective limits of signal coverage for nodes 102-1, 102-2, and 102-3. As depicted, ring 103-1 does not encompass node 102-2, and ring 103-2 does not encompass node 102-1, meaning that the signals from each of the two nodes does not reach the other node. In the example, the intermediate third node (i.e., node 102-3) is already receiving from the first node (i.e., node 102-1), and the second node (i.e., node 102-2) has data packets to transmit. The situation can arise that the second node will not defer its transmission, but instead will also try to transmit and, in the process, potentially corrupt the active transmission from the first node. In the example, nodes 102-1 and 102-2 are essentially hidden from each other.

If a hidden node case is suspected, then 802.11 nodes can invoke an RTS/CTS mechanism of the prior art before any data transmission, depicted in FIG. 2. This means that prior to sending a data frame, a node transmits, as part of its signal stream 201-1, Request to Send (RTS) frame 202, which contains a duration value that covers interval 203 needed for the pending data transmission, including data frame 205 and ACK frame 206. RTS frame 202 will set the NAV locally around the sender using this duration value. If the medium is free around the receiver, it responds, as part of its signal stream 201-2, with Clear to Send (CTS) frame 204, which sets the NAV for all other nodes in the vicinity of the receiver. After the RTS/CTS exchange, other nodes in the areas around the sending and receiving nodes defer their transmission through the virtual carrier sense mechanism.

Although the RTS/CTS mechanism provides interoperability with legacy stations, it is suboptimal because it requires the transmission of two CCK frames (RTS and CTS) prior to the OFDM transmission. The RTS/CTS mechanism is targeted specifically at hidden node situations, in which the area at both the sender and the receiver must be NAV protected, each by a different frame. NAV protection, however, does not necessarily have to be imposed in all OFDM transmissions, especially where it is known that no hidden nodes exist, as shown in the configuration of FIG. 3.

Telecommunications system 300 of the prior art comprises nodes 302-1, 302-2, and 302-3, each with a limit of signal coverage represented by rings 303-1, 303-2, and 303-3, respectively. Note that all three nodes are in each of the three areas of signal coverage, signifying that no hidden nodes exist in the configuration. In such a situation where no hidden nodes exist—a property that can be readily determined—it is disadvantageous to use the additional overhead of the RTS/CTS mechanism.

The need exists for a technique to allow enhanced stations and legacy stations to work with each other without the inefficiencies of signaling overhead in the prior art.

SUMMARY OF THE INVENTION

The present invention provides a technique to allow enhanced stations and legacy stations to work with each other without the inefficiencies of signaling overhead in the prior art.

In accordance with the illustrative embodiment of the present invention, an enhanced station transmits an initial, short frame using a modulation compatible with legacy stations. The frame sets the duration for a frame exchange—consisting of a data frame, followed by acknowledgement frame—in which the data frame is transmitted using an enhanced modulation format. The duration specified in the transmitted initial frame covers the time interval of the subsequent frame exchange. All stations, including legacy stations, listen in on the frame exchange and refrain subsequently from transmitting spontaneously for the time interval covered by the duration. This protects the frame exchange, even where legacy stations are incapable of listening in on the enhanced modulation. Alternatively, the frame exchange can comprise multiple data frames with corresponding acknowledgement frames.

An additional means of providing protection of the frame exchange, in accordance with another illustrative embodiment of the present invention, is by the enhanced station transmitting, during the remaining frame exchange, one or more intermediate frames that indicate duration. The enhanced station transmits the intermediate protection frame or frames using the legacy-compatible modulation. In accordance with a variation of the illustrative embodiment, each intermediate frame can also carry actual data.

The illustrative embodiment of the present invention comprises: directing to an output queue at a station a data frame to be transmitted over a shared communications network; monitoring at the station for an opportunity to transmit a first signal without colliding with signals present on the shared communications network wherein the first signal, when transmitted, is modulated according to a first modulation format and conveys the data frame; and responsive to identifying an opportunity to transmit without colliding with signals present on the shared communications network, transmitting during the opportunity a second signal modulated according to a second modulation format prior to transmitting the first signal, wherein the second signal indicates the duration of the frame exchange of the first signal and corresponding acknowledgement.

DETAILED DESCRIPTION

Figure 1:
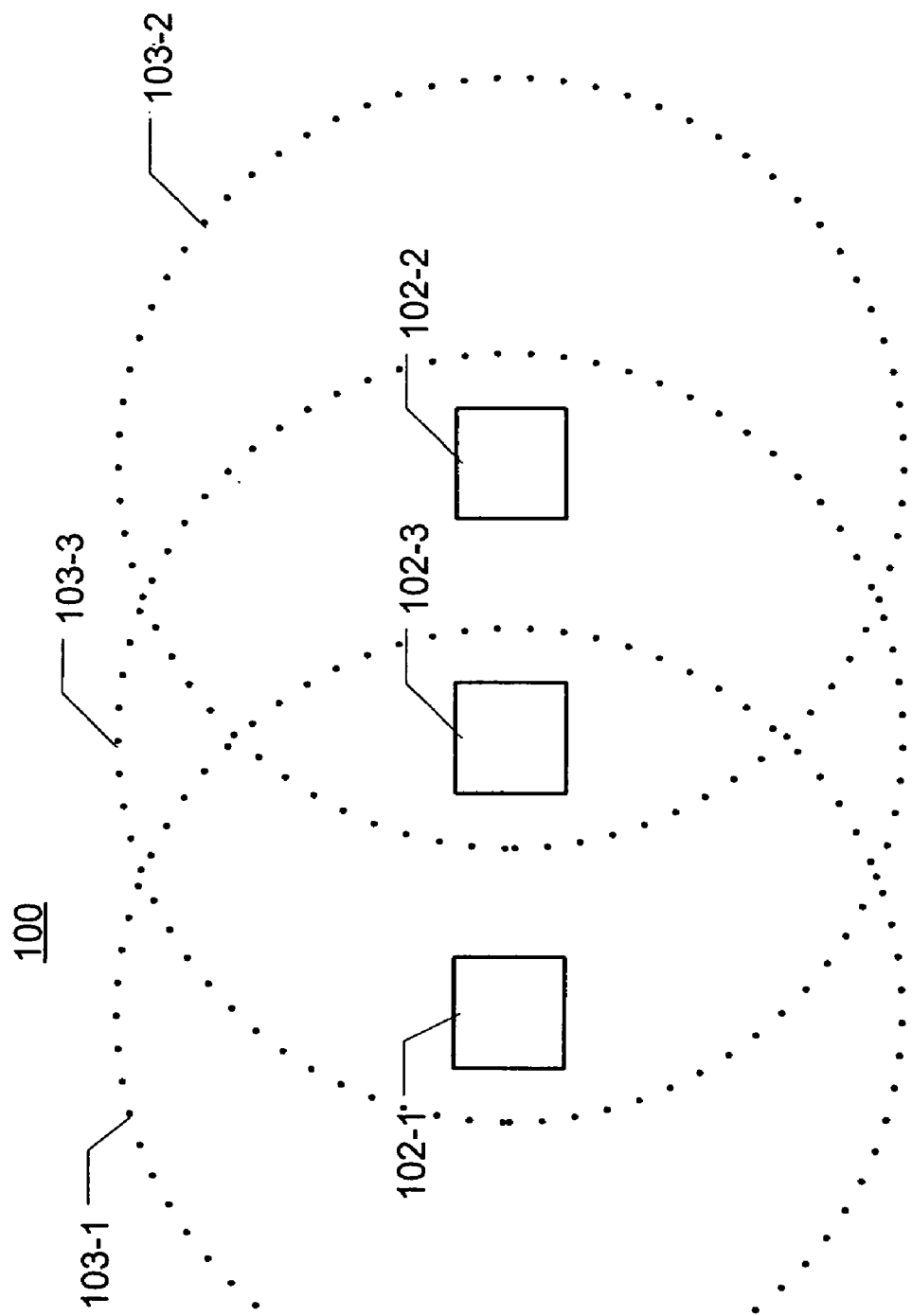
FIG. 1 depicts a schematic diagram of the respective coverage areas of three communication nodes, hidden nodes present, in the prior art.
Figure 2:
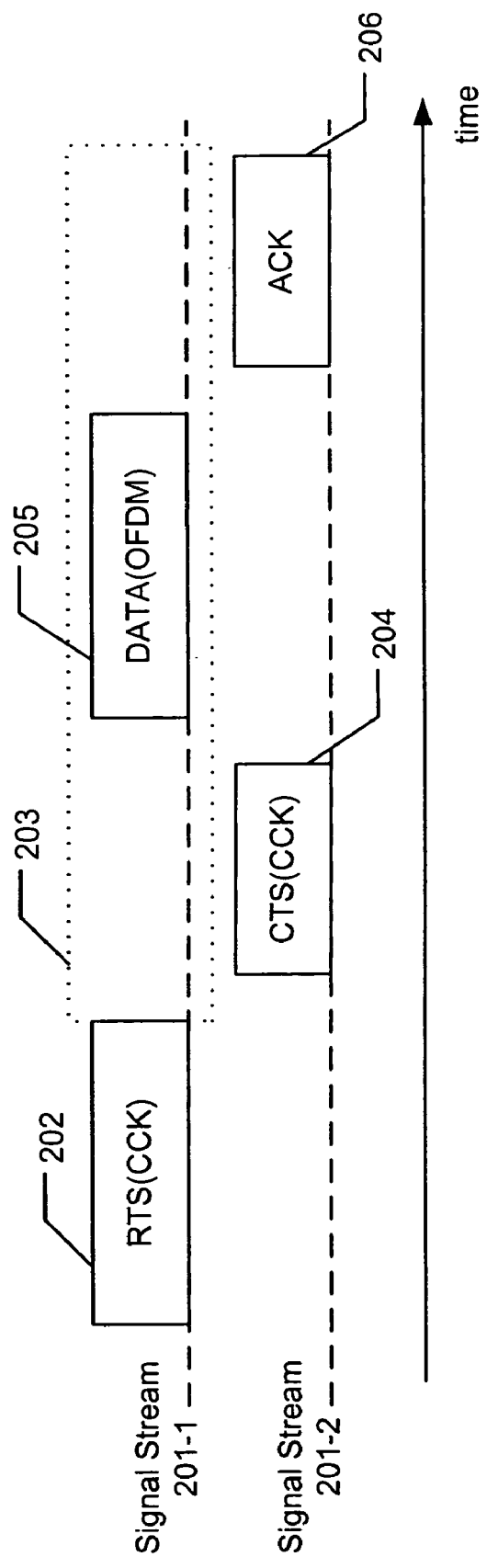
FIG. 2 depicts a message flow diagram of transmissions between two communication nodes in the prior art.
Figure 3:
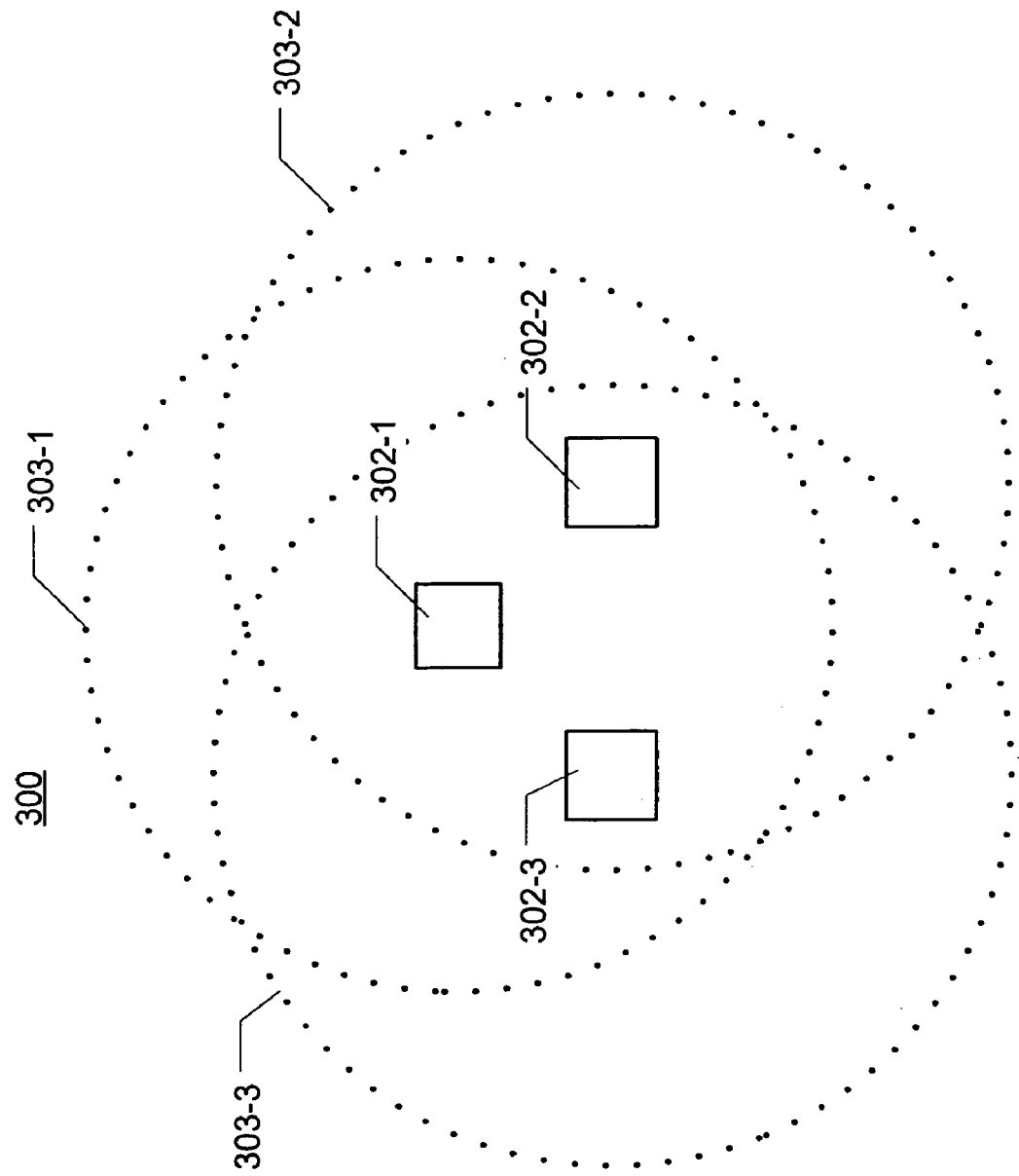
FIG. 3 depicts a schematic diagram of the respective coverage areas of three communication nodes, no hidden nodes present, in the prior art.
Figure 4:
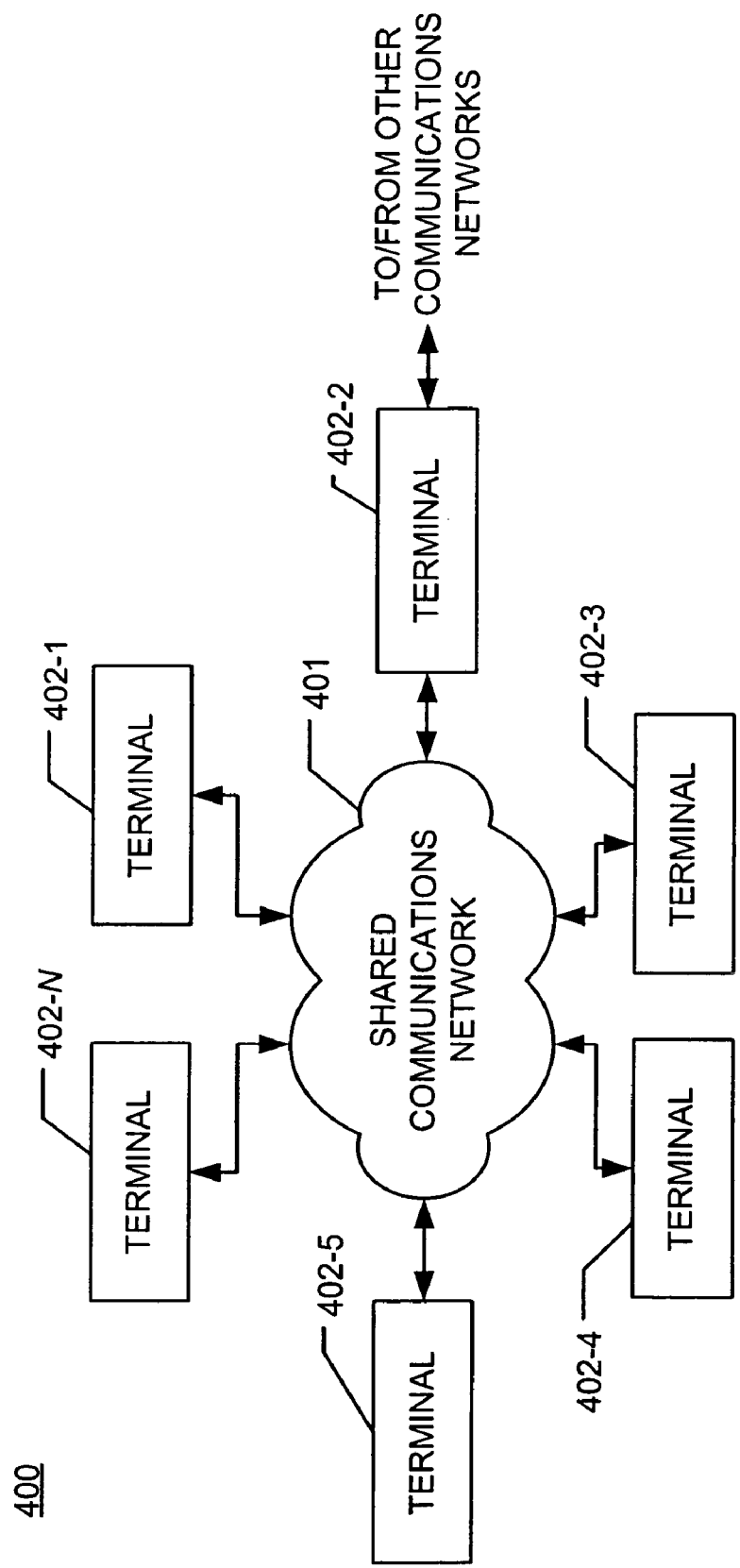
FIG. 4 depicts a schematic diagram of the illustrative embodiment of the present invention.

FIG. 4 depicts a schematic diagram of the illustrative embodiment of the present invention, telecommunications system 400, which transmits signals between stations (i.e., nodes) 402-1 through 402-N, wherein N is a positive integer, over shared communications network 401. Each of stations 402-1 through 402-N can be a stationary, portable, or mobile type with different types in the mix.

In accordance with the illustrative embodiment, telecommunications system 400 is a packet-switched network, in contrast to a circuit-switched network, as is well known to those skilled in the art. In other words, a macro data structure (e.g., a text file, a portion of a voice conversation, etc.) of indefinite size is not necessarily transmitted across shared communications network 401 intact, but rather might be transmitted in small pieces.

Each of these small pieces is encapsulated into a data structure called a "data frame," and each data frame traverses shared communications network 401 independently of the other data frames. The intended receiver of the macro data structure collects all of the data frames as they are received, recovers the small pieces of data from each, and reassembles them into the macro data structure. This process is described in more detail below.

Shared communications network 401 can be a wireless or wireline or hybrid wireless and wireline network. A salient characteristic of shared communications network 401 is that every data frame transmitted on shared communications network 401 by any station is received or "seen" by every station on shared communications network 401, regardless of whether the data frame was intended for it or not. In other words, shared communications network 401 is effectively a broadcast medium.

If shared communications network 401 is wireless, in whole or in part, embodiments of the present invention can use a variety of radio or optical frequencies and transmission methods. Possible radio frequency spectrum, if used, includes the Industrial, Scientific, and Medical (ISM) frequency band in the range of 2.4 GHz. Shared communications network 401 could be a wireless local area network.

It will be clear to those skilled in the art how to make and use shared communications network 401. It will also be clear to those skilled in the art that the shared communications network depicted in FIG. 4 is illustrative only and that other types of communications networks are within the scope of the present invention.

Stations 402-1 through 402-N receive or generate the macro data structure and prepare it for transmission over shared communications network 401. The macro data structure can represent, for example, telemetry, text, audio, video, etc. Alternatively, one or more of stations 402-1 through 402-N (e.g., station 402-2, etc.) can function as gateways between shared communications network 401 and other communications networks. In functioning as a gateway, a station receives the macro data structure from another communications network.

Figure 5:
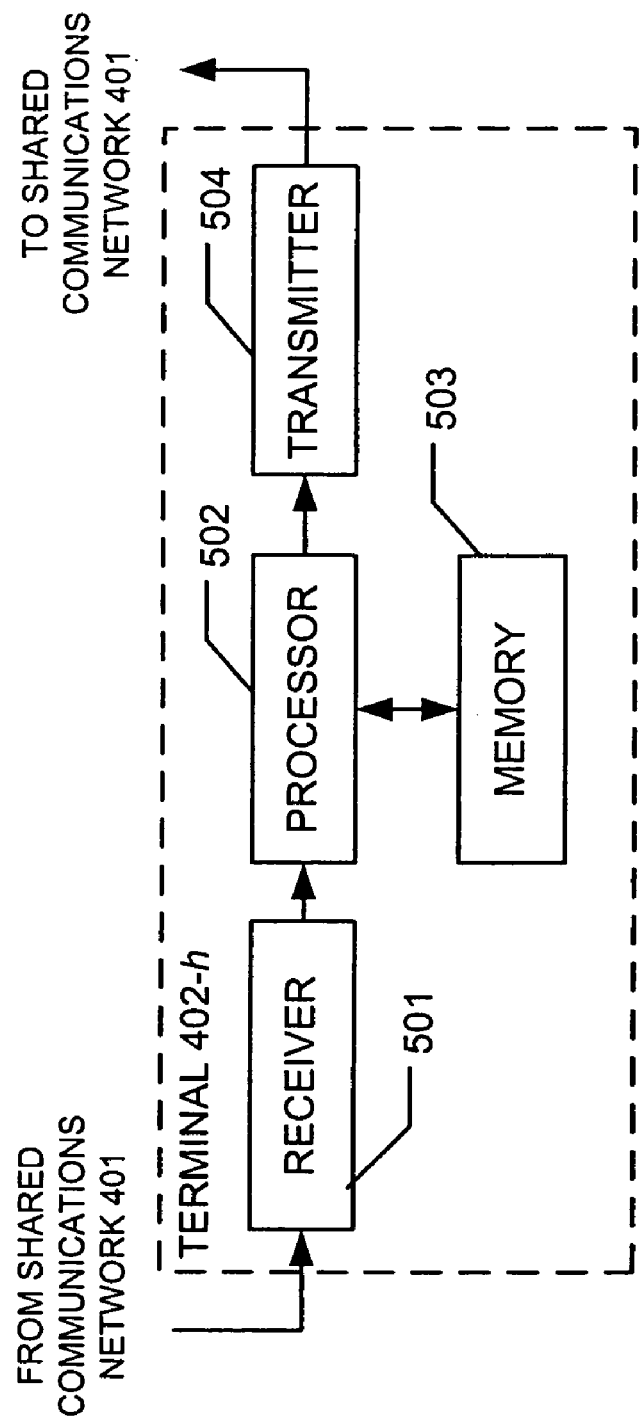
FIG. 5 depicts a block diagram of the salient components of station 402-x, for x=1 through N, in accordance with the illustrative embodiment of the present invention.

FIG. 5 depicts a block diagram of the salient components of station 402-$x$, for $x=1$ through N, in accordance with the illustrative embodiment of the present invention. Receiver 501 comprises the wireless or wireline or hybrid wireless and wireline interface circuitry that enables station 402-$x$ to receive data frames from communications network 401. When receiver 501 receives a data frame from shared communications network 401, it passes the data frame to processor 502 for processing. It will be clear to those skilled in the art how to make and use receiver 501.

Processor 502 is a general-purpose or special-purpose processor that is capable of performing the functionality described below and with respect to FIGS. 6 through 10. In particular, processor 502 is capable of storing data into memory 503, retrieving data from memory 503, and of executing programs stored in memory 503. Memory 503 accommodates input queues and output queues for incoming data and outgoing messages (including data frames), respectively. It will be clear to those skilled in the art how to make and use processor 502 and memory 503.

Transmitter 504 comprises the wireless or wireline or hybrid wireless and wireline interface circuitry that enables station 502-$x$ to transmit data frames onto shared communications network 401. It will be clear to those skilled in the art how to make and use transmitter 504.

In accordance with the illustrative embodiment of the present invention, not all of stations 402-1 through 402-N are of identical capability. Situations involving stations with heterogeneous capabilities can occur, for example, where modern stations are added to a telecommunication system that comprises only legacy stations. Additionally, the situation can result where some, but not all, of the stations in a telecommunications system are upgraded with additional capabilities. Whatever the reason, it will be clear to those skilled in the art why telecommunications systems exist that comprise stations with heterogeneous capabilities.

In accordance with the illustrative embodiment of the present invention, some of stations 402-1 through 402-N are capable of transmission using an older modulation format, but not a newer modulation format. For the purposes of this specification, these stations are hereinafter called "legacy stations." The example of a legacy station in the illustrative embodiment is an 802.11(b)-capable station using CCK modulation only. In contrast, others of stations 402-1 through 402-N are capable of transmission using the newer modulation format, in addition to the older modulation format. For the purposes of this specification, these stations are hereinafter called "upgraded stations." The example of a legacy station in the illustrative embodiment is an 802.11(g)-capable station using both OFDM modulation and CCK modulation. In accordance with the illustrative embodiment of the present invention, legacy stations and upgraded stations are capable of communicating with each other because the upgraded stations transmit data frames that are intended for legacy stations in the modulation format that is used by the legacy stations.

Figure 6:
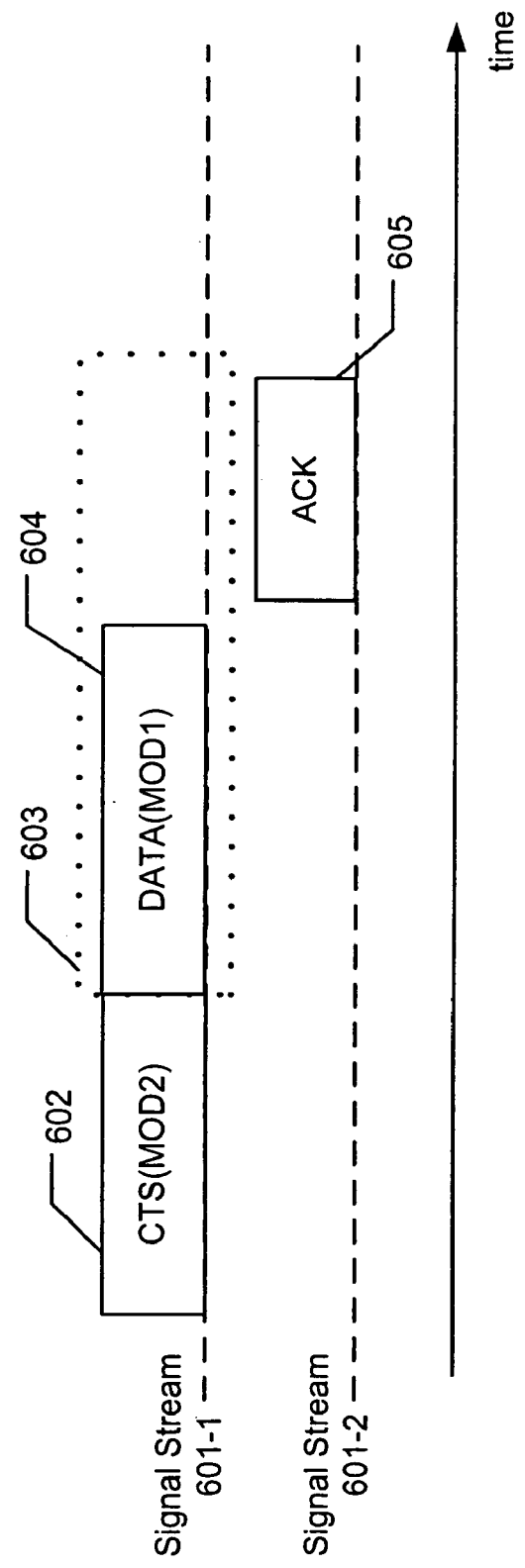
FIG. 6 depicts a message flow diagram of the first variation of the first embodiment of the present invention.

FIG. 6 depicts a message flow diagram of the first variation of the first illustrative embodiment of the present invention. Signal stream 601-1 represents the sequence of messages transmitted by a first station on shared communications network 401, in which at least some of the messages are intended for a second station. Signal stream 601-2 represents the sequence of messages transmitted by the second station on shared communications network 401, in which at least some of the messages are intended for the first station. Both stations are of the upgraded type.

Prior to sending a data frame, the first station transmits, as part of its signal stream 601-1, a frame indicating clear to send, CTS frame 602. CTS frame 602 contains a duration field with a value that covers time interval 603 associated with the frame exchange of pending data transmission and corresponding acknowledgement. Time interval 603 comprises the transmission times for data frame 604 and ACK frame 605. The value of the duration field representing time interval 603 can be calculated, for example, by adding up the anticipated transmission times of the relevant signals to be subsequently transmitted. The value can be determined empirically, it can be estimated, or it can be determined in another way. It can comprise a margin of variation in transmission, or it can comprise no extra margin. It will be clear to those skilled in the art how to calculate and set the value of the duration field in CTS frame 602.

It will be clear to those skilled in the art that a different frame can be used in place of CTS frame 602, such as a null frame, a data frame with an empty payload, etc., to achieve the same purpose of indicating duration.

As part of the illustrative embodiment, although the first station is capable of transmitting in an enhanced first modulation format (i.e., "MOD1"), the first station transmits CTS frame 602 using a legacy-compatible second modulation format (i.e., "MOD2"). This allows legacy stations to listen in and set their NAV counters to the value of the transmitted duration field in CTS frame 602, causing those stations to refrain from transmitting spontaneously during the duration of the frame exchange. An example of the first modulation format is orthogonal frequency division multiplexing (OFDM). An example of the second modulation format is complementary code keying (CCK). As part of the illustrative embodiment, the first station transmits CTS frame 602 (or equivalent) to itself, consequently not requiring a second station to respond. Furthermore, the first station does not have to acknowledge CTS frame 602, since the node sent the frame to itself, minimizing message overhead.

The first station then immediately transmits data frame 604 using the enhanced first modulation format. The second station, upon receiving data frame 604, responds by transmitting ACK frame 605. ACK frame 605 can be sent using either the first modulation format or second modulation format, since the first station can understand either format. If ACK frame 605 is sent in the legacy second modulation format, then additional protection is added against legacy stations newly arriving into shared communications network 401 that were previously unavailable to set their NAV counters. Both data frame 604 and ACK frame 605 are protected by the NAV counter running in nearby legacy stations.

Throughout the time interval occupied by signal streams 601-1 and 601-2, other stations present on shared communications network 401, comprising legacy stations (if present) and other enhanced stations (if present), are presumably monitoring for an opportunity to transmit signals without colliding with signals already present. The legacy stations sense shared communications network 401 for signals modulated according to the second modulation format. The stations refrain from transmitting spontaneously if a signal is present. Furthermore, the stations refrain from transmitting during the time interval specified by the value in the transmitted duration field.

It will be clear to those skilled in the art how to format, encode, transmit, receive, and decode CTS frame 602 (or equivalent, as discussed), data frame 604, and ACK frame 605.

Figure 7:
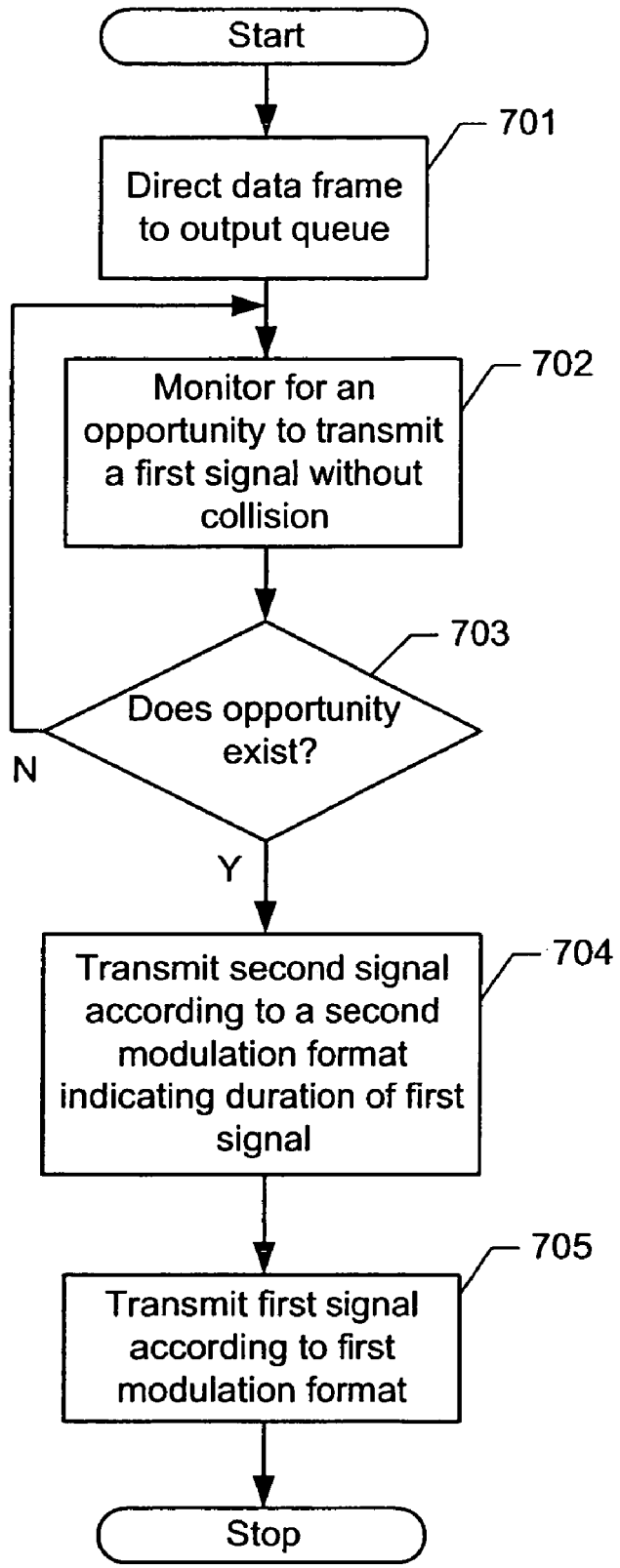
FIG. 7 depicts a flowchart of the tasks performed by an enhanced station in transmitting a frame in the first embodiment of the present invention.

FIG. 7 depicts a flowchart of the tasks constituting the first illustrative embodiment and performed by an upgraded station in queuing and transmitting a data frame in the presence of legacy stations on shared communications network 401. It will be clear to those skilled in the art which of the tasks depicted in FIG. 7 can be performed simultaneously or in a different order than that depicted.

At task 701, the upgraded station directs a formed data frame to an output queue. It will be clear to those skilled in the art how to form the data frame and how to make and use the output queue.

At task 702, the upgraded station monitors for an opportunity to transmit a first signal that conveys the queued data frame, without collision and by using a first modulation format. The first modulation format can be, for example, the OFDM format existing within an 802.11(g)-based wireless local area network. It will be clear to those skilled in the art how to recognize when it is improper to transmit and how to recognize when it is appropriate to transmit. If it is determined at task 703 that an opportunity exists, control proceeds to task 704.

At task 704, the upgraded station transmits onto shared communications network 401 a second signal that is modulated according to a second modulation format. As part of the illustrative embodiment, the second modulation format is the legacy format understood by all the stations. For example, this can be CCK format, as opposed to the enhanced OFDM format also existing within an 802.11(g)-based wireless local area network. As part of the illustrative embodiment, the information conveyed by the second signal indicates the allotted duration of subsequently transmitted signals, in this case, the first signal transmitted by the transmitting station and the corresponding acknowledgement from the receiving station. The value of the duration field can be calculated, for example, by adding up the anticipated transmission times of the relevant signals to be subsequently transmitted. The value can be determined empirically, it can be estimated, or it can be determined in another way. It can comprise a margin of variation in transmission, or it can comprise no extra margin. It will be clear to those skilled in the art how to calculate and set the duration.

The second signal (e.g., conveying a clear to send indication, etc.) is transmitted by the transmitting station to itself (e.g., by the station specifying its own address as the destination, etc.). It will be clear to those skilled in the art how a station can transmit a signal to itself.

At task 705, the upgraded station transmits onto shared communications network 401 the first signal. The first signal can convey a data frame or it can convey other information. The upgraded station transmits the first signal (and can receive a signal indicating an acknowledgement) while under NAV protection as specified in the duration field sent previously in the second signal.

It will be clear to those skilled in the art how to perform each of tasks 701 through 705.

Figure 8:
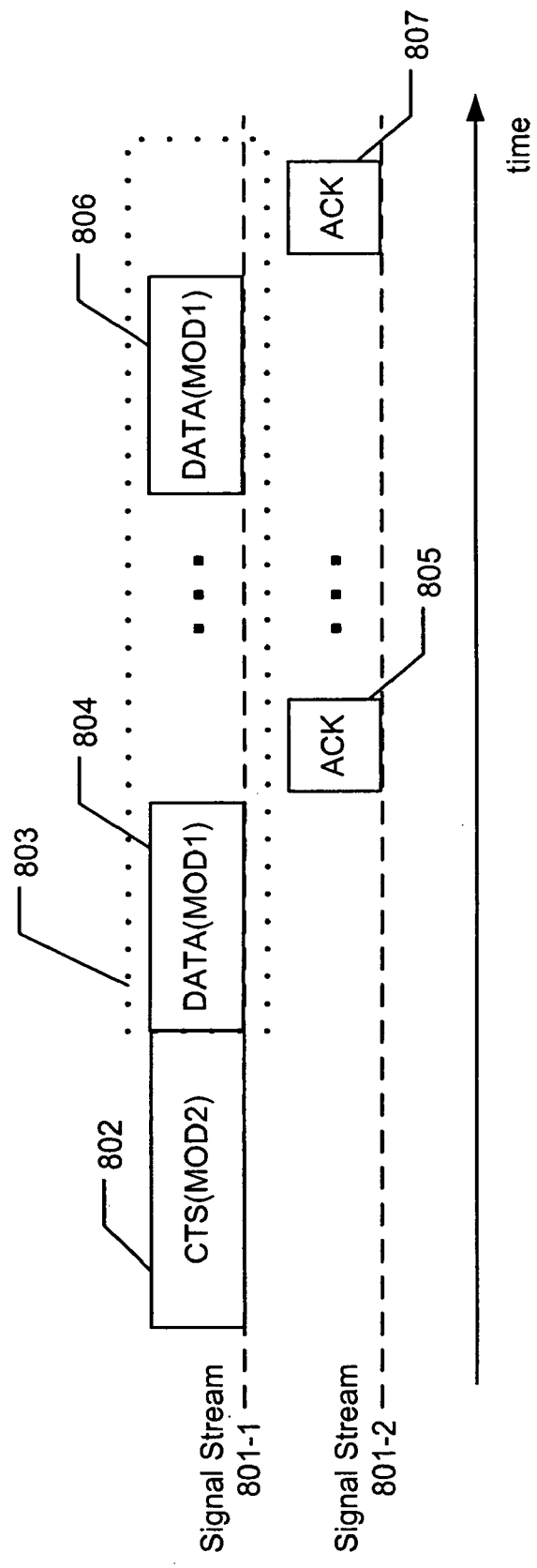
FIG. 8 depicts a message flow diagram of the second variation of the first embodiment of the present invention.

FIG. 8 depicts a message flow diagram of the second variation of the first illustrative embodiment of the present invention. Signal stream 801-1 represents the sequence of messages transmitted by a first station on shared communications network 401, in which at least some of the messages are intended for a second station. Signal stream 801-2 represents the sequence of messages transmitted by the second station on shared communications network 401, in which at least some of the messages are intended for the first station. Both stations are of the upgraded type.

Prior to sending a data frame, the first station transmits, as part of its signal stream 801-1, a frame indicating clear to send, CTS frame 802, which contains a duration field with a value that covers time interval 803 associated with the frame exchange of pending data transmissions and acknowledgements. Time interval 803 comprises the transmission times for multiple data frames (e.g., data frames 804 and 806, etc.) and corresponding ACK frames (e.g., ACK frames 805 and 806, etc.). The value of the duration field representing time interval 803 can be calculated, for example, by adding up the anticipated transmission times of the relevant signals to be subsequently transmitted. The value can be determined empirically, it can be estimated, or it can be determined in another way. It can comprise a margin of variation in transmission, or it can comprise no extra margin. It will be clear to those skilled in the art how to calculate and set the value of the duration field in CTS frame 802.

It will be clear to those skilled in the art that a different frame can be used in place of CTS frame 802, such as a null frame, a data frame with an empty payload, etc., to achieve the same purpose of indicating duration. As part of the illustrative embodiment, although the first station is capable of transmitting in an enhanced first modulation format (i.e., "MOD1"), the first station transmits CTS frame 802 in similar fashion as is CTS frame 602 and for similar reasons.

The first station then immediately transmits first data frame 804 using the enhanced first modulation format. The second station, upon receiving first data frame 804, responds by transmitting ACK frame 805. ACK frame 805 can be sent using either the first modulation format or second modulation format, since the first station can understand either format. If ACK frame 805 is sent in the legacy second modulation format, then additional protection is added against legacy stations newly arriving into shared communications network 401 that were previously unavailable to set their NAV counters. Both first data frame 804 and ACK frame 805 are protected by the NAV counter running in nearby legacy stations.

The first station can then subsequently transmit additional data frames, paired with additional ACK frames sent by the second station. Finally, the first station transmits last data frame 806 using the enhanced first modulation format. The second station, upon receiving last data frame 806, responds by transmitting ACK frame 807. ACK frame 807 is sent in similar fashion as ACK frame 805. Both last data frame 806 and ACK frame 807 are protected by the NAV counter running in nearby legacy stations.

Throughout the time interval occupied by signal streams 801-1 and 801-2, other stations present on shared communications network 401, comprising legacy stations (if present) and other enhanced stations (if present), are presumably monitoring for an opportunity to transmit signals without colliding with signals already present. The legacy stations sense shared communications network 401 for signals modulated according to the second modulation format. The stations refrain from transmitting spontaneously if a signal is present.

Furthermore, the stations refrain from transmitting during the time interval specified by the value in the transmitted duration field.

It will be clear to those skilled in the art how to format, encode, transmit, receive, and decode CTS frame 802 (or equivalent, as discussed), first data frame 804, last data frame 806, and ACK frames 805 and 807.

Figure 9:
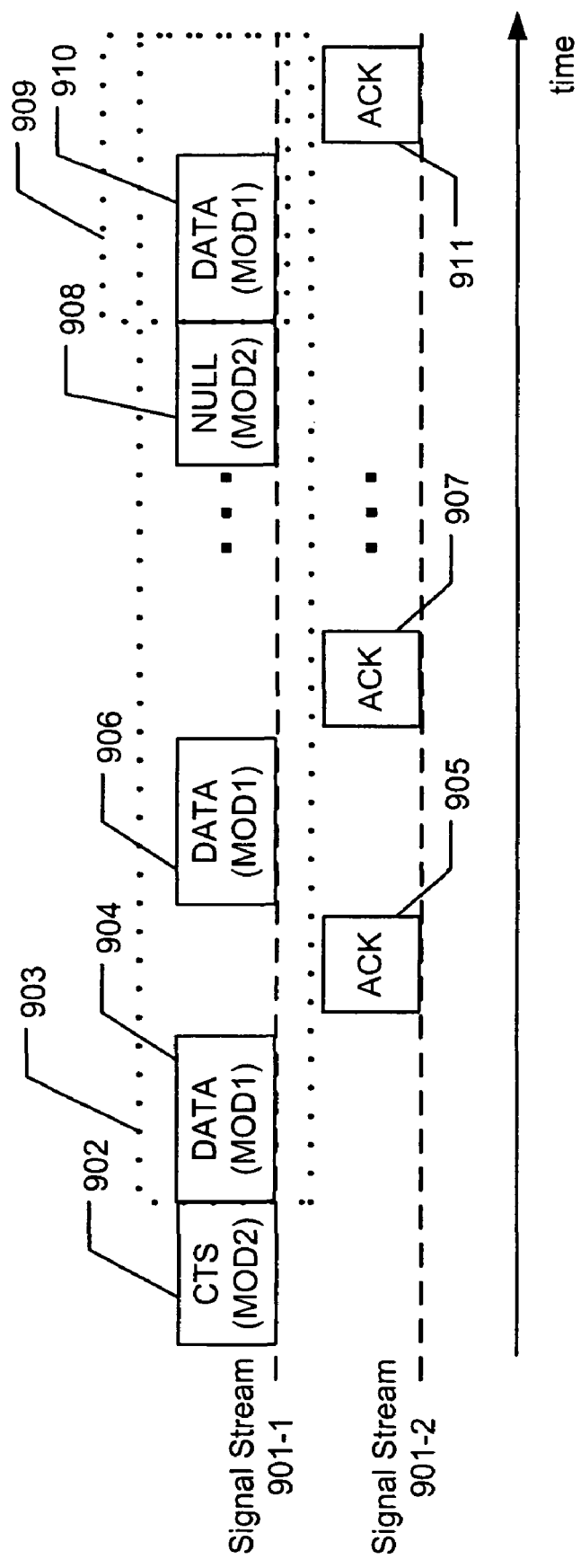
FIG. 9 depicts a message flow diagram of the first variation of the second embodiment of the present invention.

FIG. 9 depicts a message flow diagram of the first variation of the second illustrative embodiment of the present invention. Signal stream 901-1 represents the sequence of messages transmitted by a first station on shared communications network 401, in which at least some of the messages are intended for a second station. Signal stream 901-2 represents the sequence of messages transmitted by the second station on shared communications network 401, in which at least some of the messages are intended for the first station. Both stations are of the upgraded type.

Prior to sending a data frame, the first station transmits, as part of its signal stream 901-1, a frame indicating clear to send, CTS frame 902. CTS frame 902 contains a duration field with a value that covers time interval 903 associated with the frame exchange of pending data transmissions and acknowledgements. Time interval 903 comprises the transmission times for multiple data frames (e.g., data frames 904, 906, and 910; etc.) and corresponding ACK frames (e.g., ACK frames 905, 907, and 911; etc.). The value of the duration field representing time interval 903 can be calculated, for example, by adding up the anticipated transmission times of the relevant signals to be subsequently transmitted. The value can be determined empirically, it can be estimated, or it can be determined in another way. It can comprise a margin of variation in transmission, or it can comprise no extra margin. It will be clear to those skilled in the art how to calculate and set the value of the duration field in CTS frame 902.

It will be clear to those skilled in the art that a different frame can be used in place of CTS frame 902, such as a null frame, a data frame with an empty payload, etc., to achieve the same purpose of indicating duration. As part of the illustrative embodiment, although the first station is capable of transmitting in an enhanced first modulation format (i.e., "MOD1"), the first station transmits CTS frame 902 in similar fashion as CTS frame 602 and for similar reasons.

The first station can then immediately transmit first data frame 904 using the enhanced first modulation format. The second station, upon receiving first data frame 904, responds by transmitting ACK frame 905. ACK frame 905 can be sent using either the first modulation format or second modulation format, since the first station can understand either format. If ACK frame 905 is sent in the legacy second modulation format, then additional protection is added against legacy stations newly arriving into shared communications network 401 that were previously unavailable to set their NAV counters. Both first data frame 904 and ACK frame 905 are protected by the NAV counter running in nearby legacy stations.

The first station can then subsequently transmit additional data frames (e.g., data frame 906, etc.), paired with additional ACK frames (e.g., ACK frame 907, etc.) sent by the second station.

At some point interposed in the series of data frame transmissions, the first station can choose to transmit an intermediate, reinforcing protection frame. Specifically, the first station transmits, as part of its signal stream 901-1, null frame 908, which contains a duration field with a value that covers time interval 909 associated with the frame exchange of pending data transmissions and acknowledgements that remain. Time interval 909 comprises the transmission times for multiple data frames (e.g., data frame 910, etc.) and corresponding ACK frames (e.g., ACK frame 911, etc.). It will be clear to those skilled in the art how to calculate and set the value of the duration field in null frame 908.

It will be clear to those skilled in the art that a different frame can be used in place of null frame 908 to achieve the same purpose of indicating duration. As part of the illustrative embodiment, although the first station is capable of transmitting in an enhanced first modulation format (i.e., "MOD1"), the first station transmits null frame 908 in similar fashion as CTS frame 602 and for similar reasons. The first station can transmit null frame 908 intermittently whenever it is determined to do so. The transmission can be based upon time, new stations arriving into shared communications network 401, etc. If based upon time, the transmission can be periodic or aperiodic. It will be clear to those skilled in the art how to determine when null frame 908 (or equivalent, as discussed) is transmitted.

The first station transmits data frame 910 using the enhanced first modulation format. The second station, upon receiving data frame 910, responds by transmitting ACK frame 911. ACK frame 911 is sent in similar fashion as ACK frame 905. The NAV counter running in nearby legacy stations protects both data frame 910 and ACK frame 911, in addition to any additional data frame/ACK frame pairs transmitted during the duration period.

Throughout the time interval occupied by signal streams 901-1 and 901-2, other stations present on shared communications network 401, comprising legacy stations (if present) and other enhanced stations (if present), are presumably monitoring for an opportunity to transmit signals without colliding with signals already present. The legacy stations sense shared communications network 401 for signals modulated according to the second modulation format. The stations refrain from transmitting spontaneously if a signal is present. Furthermore, the stations refrain from transmitting during the time interval specified by the value in the transmitted duration field.

It will be clear to those skilled in the art how to format, encode, transmit, receive, and decode CTS frame 902 (or equivalent, as discussed); null frame 908 (or equivalent, as discussed); data frames 904, 906, and 910; and ACK frames 905, 907, and 911. Finally, it will be clear to those skilled in the art that multiple intermediate frames (e.g., null frame 908, etc.) can be transmitted to reinforce the NAV protection.

Figure 10:
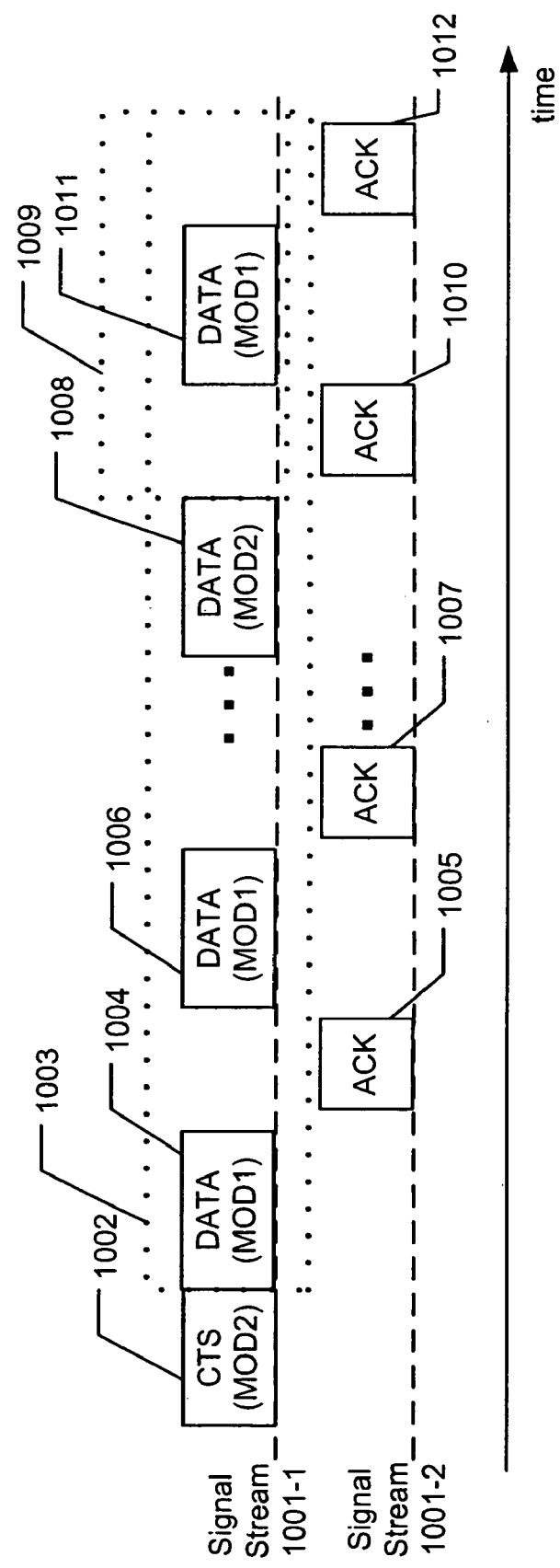
FIG. 10 depicts a message flow diagram of the second variation of the second embodiment of the present invention.

FIG. 10 depicts the second variation of the second illustrative of the present invention. Signal stream 1001-1 as transmitted by a first station comprises CTS frame 1002, and data frames 1004, 1006, 1008, and 1011. Signal stream 1001 as transmitted by a second station comprises ACK frames 1005, 1007, 1010, and 1012. The variation depicted is similar to that depicted in FIG. 9, except that a data frame (i.e., data frame 1008) is used to reinforce the NAV protection, instead of a null frame.

Specifically, the first station transmits, as part of its signal stream 1001-1 and at an intermediate point, data frame 1008, which contains a duration field with a value that covers time interval 1009 associated with the frame exchange of pending data transmissions and acknowledgements that remain. Time interval 1009 comprises the transmission times for multiple data frames (e.g., data frame 1011, etc.) and corresponding ACK frames (e.g., ACK frames 1010 and 1012, etc.). It will be clear to those skilled in the art how to calculate and set the value of the duration field in data frame 1008.

As part of the illustrative embodiment, although the first station is capable of transmitting in an enhanced first modulation format (i.e., "MOD1"), the first station transmits data frame 1008 using a legacy-compatible second modulation format (i.e., "MOD2"). This allows legacy stations to listen in and set their NAV counters to the value of the transmitted duration field in data frame 1008, causing those stations to refrain from transmitting spontaneously during the duration of the frame exchange. Note that data frame 1008 also contains valid data that had to be transmitted in some data frame.

Throughout the time interval occupied by signal streams 1001-1 and 1001-2, other stations present on shared communications network 401, comprising legacy stations (if present) and other enhanced stations (if present), are presumably monitoring for an opportunity to transmit signals without colliding with signals already present. The legacy stations sense shared communications network 401 for signals modulated according to the second modulation format. The stations refrain from transmitting spontaneously if a signal is present. Furthermore, the stations refrain from transmitting during the time interval specified by the value in the transmitted duration field.

It will be clear to those skilled in the art how to format, encode, transmit, receive, and decode CTS frame 1002 (or equivalent, as discussed); data frames 1004, 1006, 1008, and 1011; and ACK frames 1005, 1007, 1010, and 1012. Finally, it will be clear to those skilled in the art that multiple intermediate frames (e.g., data frame 1008, etc.) can be transmitted to reinforce the NAV protection.

Figure 11:
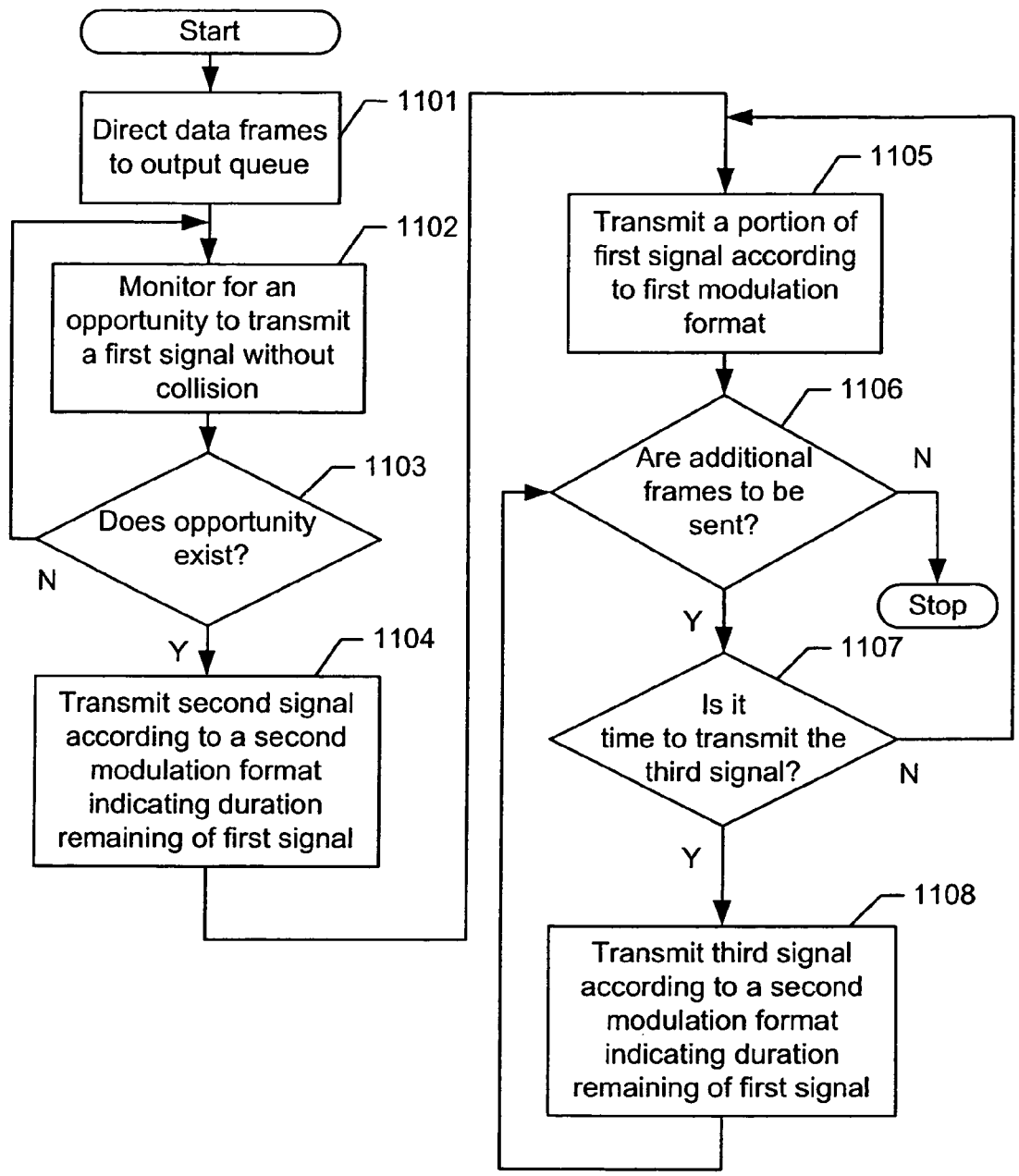
FIG. 11 depicts a flowchart of the tasks performed by an enhanced station in transmitting a frame in the second embodiment of the present invention.

FIG. 11 depicts a flowchart of the tasks constituting the second illustrative embodiment and performed by an upgraded station in queuing and transmitting a data frame in the presence of legacy stations on shared communications network 401. It will be clear to those skilled in the art which of the tasks depicted in FIG. 11 can be performed simultaneously or in a different order than that depicted.

At task 1101, the upgraded station directs formed data frames to an output queue. It will be clear to those skilled in the art how to form data frames and how to make and use the output queue.

At task 1102, the upgraded station monitors for an opportunity to transmit a first signal that conveys the queued data frames, without collision and by using a first modulation format. The first modulation format can be, for example, the OFDM format existing within an 802.11(g)-based wireless local area network. It will be clear to those skilled in the art how to recognize when it is improper to transmit and how to recognize when it is appropriate to transmit. If it is determined at task 1103 that an opportunity exists, control proceeds to task 1104.

At task 1104, the upgraded station transmits onto shared communications network 401 a second signal that is modulated according to a second modulation format. As part of the illustrative embodiment, the second modulation format is the legacy format understood by all the stations. For example, this can be CCK format, as opposed to the enhanced OFDM format also existing within an 802.11(g)-based wireless local area network. As part of the illustrative embodiment, the information conveyed by the second signal indicates the allotted duration of subsequently transmitted signals, in this case, the first signal comprising a plurality of data frames, the third signal comprising intermediate protection frames, and the corresponding acknowledgements from the receiving station. The value of the duration field can be calculated, for example, by adding up the anticipated transmission times of the relevant signals to be subsequently transmitted. The value can be determined empirically, it can be estimated, or it can be determined in another way. It can comprise a margin of variation in transmission, or it can comprise no extra margin. It will be clear to those skilled in the art how to calculate and set the duration.

The second signal (e.g., conveying a clear to send indication, etc.) is transmitted by the transmitting station to itself (e.g., by the station specifying its own address as the destination, etc.). It will be clear to those skilled in the art how a station can transmit a signal to itself.

At task 1105, the upgraded station transmits onto shared communications network 401 a portion of the first signal. The portion of the first signal can convey a single data frame or it can convey other information. The upgraded station transmits the portion of the first signal (and can receive a signal indicating an acknowledgement) while under NAV protection as specified in the duration field sent previously in the second signal.

At task 1106, if additional frames of any kind are to be transmitted, control proceeds to task 1107. If not, execution of the tasks depicted in FIG. 11 stops.

At task 1107, if it is time to transmit a third signal, control proceeds to task 1108. If not, control proceeds to task 1105.

At task 1108, the upgraded station transmits onto shared communications network 401 a third signal that is modulated according to the second modulation format, which, as explained earlier, is the legacy format understood by all the stations. For example, this can be CCK format, as opposed to the enhanced OFDM format also existing within an 802.11 (g)-based wireless local area network. As part of the illustrative embodiment, the information conveyed by the third signal indicates the allotted duration of subsequently transmitted signals, in this case, the remaining portions of the first signal comprising one or more data frames, any remaining third signals comprising intermediate protection frames, and the corresponding one or more acknowledgements from the receiving station. The duration represented in the third signal can be calculated by adding up the anticipated transmission times of the relevant signals to be subsequently transmitted. It will be clear to those skilled in the art how to calculate and set the duration.

The third signal, if conveying a null frame or similar non-data frame message, is transmitted by the transmitting station to itself (e.g., by the station specifying its own address as the destination, etc.). It will be clear to those skilled in the art how a station can transmit a signal to itself. Alternatively, the third signal can convey a data frame carrying underlying data that would had to have been transmitted to another station, anyway. In this alternative case, the third signal is actually intended for a receiving station, although all stations are able to listen to it (since it is transmitted in the second modulation format) and read the duration field information.

The first station can transmit the third signal intermittently whenever it is determined to do so. The transmission can be based upon time, new stations arriving into shared communications network 401, etc. If based upon time, the transmission can be periodic or aperiodic. It will be clear to those skilled in the art how to determine when the third signal is transmitted.

It will be clear to those skilled in the art how to perform each of tasks 1101 through 1108.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method comprising:
a transmitting station monitoring a shared-communications medium for an opportunity to transmit a first signal and a second signal via the shared-communications medium;
the transmitting station transmitting the second signal using a second modulation format on the shared communications medium, the second signal conveying a particular frame that includes a destination address of the transmitting station and indicates a duration for which the shared-communications medium is reserved, and
the transmitting station transmitting the first signal in accordance with a first modulation format on the shared-communications medium after the second signal without waiting for a responsive transmission to the second signal, wherein the first signal conveys at least one data frame within the duration indicated in the particular frame.

2. The method of claim 1, wherein the second modulation format is different than the first modulation format.

3. The method of claim 1, wherein the first modulation format comprises orthogonal frequency division multiplexing (OFDM) and the second modulation format comprises complementary code keying (CCK).

4. The method of claim 1, further comprising the transmitting station
transmitting a third signal on the shared-communications medium within the duration indicated in the particular frame, wherein the third signal conveys a data frame in accordance with the second modulation format that reinforces the duration indicated in the particular frame.

5. The method of claim 1, wherein the particular frame and the at least one data frame are each addressed to different destination addresses.

6. The method of claim 1, wherein the duration indicates an expected transmission time of the at least one data frame.

7. The method of claim 1, wherein the duration indicates, to a receiving station, to refrain from transmitting for the duration.

8. A station comprising:
a transmitter for transmitting a first signal and a second signal on a shared communications medium, the transmitter configured to:
transmit the second signal using a second modulation format on the shared-communications medium, the second signal conveying a particular frame that includes a destination address of the transmitting station, the second signal further indicating a duration; and
transmit the first signal in accordance with a first modulation format on the shared-communications medium after the second signal without waiting for a responsive transmission to the second signal, wherein the first signal conveys at least one data frame within the duration.

9. The station of claim 8, wherein the second modulation format is different than the first modulation format.

10. The station of claim 8, wherein the first modulation format comprises orthogonal frequency division multiplexing (OFDM) and the second modulation format comprises complementary code keying (CCK).

11. The station of claim 8, wherein the transmitter also transmits a third signal on the shared-communications medium, conveying a data frame in accordance with the second modulation format that reinforces the duration indicated in the particular frame.

12. The station of claim 8, wherein the particular frame and the at least one data frame are each addressed to different destination addresses.

13. The station of claim 8, wherein the duration indicates an expected transmission time of the at least one data frame.

14. The station of claim 8, wherein the duration indicates, to a receiving station, to refrain from transmitting for the duration.

15. A method comprising:
monitoring a shared-communications medium at a transmitting station for an opportunity to transmit a first signal, a second signal, and a third signal via the shared-communications medium;
transmitting the second signal from the transmitting station in accordance with a second modulation format on the shared-communications medium, the second signal conveying a particular frame that includes a destination address of the transmitting station and indicates a duration for which the shared-communications medium is reserved;
transmitting the first signal from the transmitting station in accordance with a first modulation format on the shared-communications medium after the second signal without waiting for a responsive transmission to the second signal, wherein the first signal conveys at least one data frame within the duration indicated in the particular frame; and
transmitting the third signal from the transmitting station in accordance with the second modulation format on the shared communications medium after the first signal, wherein the third signal conveys a data frame.

16. The method of claim 15, wherein the second modulation format is different than the first modulation format.

17. The method of claim 15, wherein the first modulation format comprises orthogonal frequency division multiplexing (OFDM) and the second modulation format comprises complementary code keying (CCK).

18. The method of claim 15, wherein the particular frame and the at least one data frame are each addressed to different destination addresses.

19. The method of claim 15, wherein the shared-communications medium is operative in the 2.4 GHz Industrial, Scientific, Medical band of the radio frequency spectrum.

20. The method of claim 15, wherein the duration indicates an expected transmission time of the at least one data frame.

21. The method of claim 15, wherein the duration indicates, to a receiving station, to refrain from transmitting for the duration.

22. A station comprising:
a transmitter for transmitting a first signal, a second signal, and a third signal on a shared communications medium, the transmitter configured to:
transmit the second signal in accordance with a second modulation format on the shared-communications medium, the second signal conveying a particular frame that includes a destination address of the station and indicates a duration for which the shared communications medium is reserved;
transmit the first signal in accordance with a first modulation format on the shared-communications medium after the second signal without waiting for a responsive transmission to the second signal, wherein the first signal conveys at least one data frame within the duration; and transmit the third signal in accordance with the second modulation format on the shared communications medium after the first signal, wherein the third signal conveys another data frame within the duration indicated in the particular frame.

23. The station of claim 22, wherein the second modulation format is different than the first modulation format.

24. The station of claim 22, wherein the first modulation format comprises orthogonal frequency division multiplexing (OFDM) and the second modulation format comprises complementary code keying (CCK).

25. The station of claim 22, wherein the transmitter also transmits the third signal on the shared-communications medium, conveying a data frame in accordance with the second modulation format that reinforces the duration indicated in the particular frame.

26. The station of claim 22, wherein the particular frame and the at least one data frame are each addressed to different destination addresses.

27. The station of claim 22, wherein the duration indicates, to a receiving station, to refrain from transmitting for the duration.

28. A station comprising: means for transmitting a second signal using a second modulation format on a shared-communications medium, the second signal conveying a particular frame that includes a destination address of the transmitting station and indicates a duration for which the shared-communications medium is reserved; and means for transmitting a first signal in accordance with a first modulation format on the shared-communications medium after the second signal without waiting for a responsive transmission to the second signal, wherein the first signal conveys at least one data frame within the duration indicated in the particular frame.

29. A station comprising:

a processor;

a transmitter capable of transmitting on a shared-communications medium; and a memory storing processor-executable instructions that, when executed by the processor, cause the processor to perform operations comprising:

monitoring the shared-communications medium for an opportunity to transmit a first signal and a second signal via the shared-communications medium;

transmitting the first signal from the transmitting station in accordance with a first modulation format on the shared-communications medium after the second signal without waiting for a responsive transmission to the second signal, transmitting the first signal from the transmitting station in accordance with a first modulation format on the shared-communications medium after the second signal, wherein the first signal conveys at least one data frame within the duration indicated in the particular frame.

30. The method of claim 1, further comprising transmitting the first signal immediately after transmitting the second signal.

31. The method of claim 30, wherein the particular frame is one of a clear-to-send (CTS) frame and a null data frame.

32. The station of claim 8, further comprising transmitting the first signal immediately after transmitting the second signal.

33. The station of claim 32, wherein the particular frame is one of a clear-to-send (CTS) frame and a null data frame.

34. The station of claim 28, wherein the means for transmitting the first signal transmits the first signal immediately after the means for transmitting the second signal transmits the second signal.

35. The station of claim 34, wherein the particular frame is one of a clear-to-send (CTS) frame and a null data frame.

36. The station of claim 29, wherein transmitting the first signal further comprises transmitting the first signal immediately after transmitting the second signal.

37. The station of claim 36, wherein the particular frame is one of a clear-to-send (CTS) frame and a null data frame.

* * * * *

UNITED STATES PATENT AND TRADEMARK OFFICE
CERTIFICATE OF CORRECTION

| | | |
|---|---|---|
| PATENT NO. | : 7,953,104 B2 | Page 1 of 1 |
| APPLICATION NO. | : 11/280573 | |
| DATED | : May 31, 2011 | |
| INVENTOR(S) | : Brockmann et al. | |

It is certified that error appears in the above-identified patent and that said Letters Patent is hereby corrected as shown below:

Column 13, lines 8-9, in Claim 1, delete "shared communications" and insert -- shared-communications --.

Column 13, line 45, in Claim 8, delete "shared communications" and insert -- shared-communications --.

Column 14, line 32, in Claim 15, delete "shared communications" and insert -- shared-communications --.

Column 14, line 53, in Claim 22, delete "shared communications" and insert -- shared-communications --.

Column 14, lines 60-61, in Claim 22, delete "shared communications" and insert -- shared-communications --.

Column 15, line 2, in Claim 22, delete "shared communications" and insert -- shared-communications --.

Signed and Sealed this
Fourth Day of October, 2011

David J. Kappos
*Director of the United States Patent and Trademark Office*